US012747363B2

(12) United States Patent
Nakashima et al.

(10) Patent No.: US 12,747,363 B2
(45) Date of Patent: Sep. 29, 2026

(54) ACTIVE ENERGY RAY-CURABLE INKJET INK COMPOSITION

(71) Applicant: SAKATA INX CORPORATION, Osaka (JP)

(72) Inventors: Okinori Nakashima, Osaka (JP); Takuya Myose, Osaka (JP); Jun Kawabata, Osaka (JP); Kazuhiro Fuke, Osaka (JP)

(73) Assignee: SAKATA INX CORPORATION, Osaka (JP)

( * ) Notice: Subject to any disclaimer, the term of this patent is extended or adjusted under 35 U.S.C. 154(b) by 700 days.

(21) Appl. No.: 18/252,181

(22) PCT Filed: Aug. 31, 2021

(86) PCT No.: PCT/JP2021/031822
§ 371 (c)(1),
(2) Date: May 8, 2023

(87) PCT Pub. No.: WO2022/113458
PCT Pub. Date: Jun. 2, 2022

(65) Prior Publication Data

US 2024/0018373 A1 Jan. 18, 2024

(30) Foreign Application Priority Data

Nov. 25, 2020 (JP) ................................ 2020-195510

(51) Int. Cl.
*C08F 2/46* (2006.01)
*C08F 2/50* (2006.01)
*C08G 61/04* (2006.01)
*C09D 11/101* (2014.01)
*C09D 11/106* (2014.01)
*C09D 11/30* (2014.01)

(52) U.S. Cl.
CPC .......... *C09D 11/101* (2013.01); *C09D 11/106* (2013.01); *C09D 11/30* (2013.01)

(58) Field of Classification Search
CPC ..... C09D 11/101; C09D 11/30; C09D 11/322; C09D 11/106; C09D 4/00; C08F 220/18007; C08F 220/1811; C08F 220/34; C08F 220/36; C08F 222/103
USPC ...................... 522/6, 189, 184, 71, 1; 520/1
See application file for complete search history.

(56) References Cited

U.S. PATENT DOCUMENTS

2003/0083396 A1 5/2003 Ylitalo et al.
2012/0083545 A1 4/2012 Kida et al.
2018/0030290 A1 2/2018 Hirose et al.
2018/0037766 A1 2/2018 Hirose et al.
2019/0062580 A1 2/2019 Nakashima et al.
2021/0155813 A1 5/2021 Nakashima et al.

FOREIGN PATENT DOCUMENTS

| | | | | |
|---|---|---|---|---|
| CN | 107207888 A | | 9/2017 | |
| CN | 107250294 A | | 10/2017 | |
| CN | 108699367 A | | 10/2018 | |
| CN | 111954701 A | | 11/2020 | |
| JP | 2004536925 A | | 12/2004 | |
| JP | 2012092291 A | | 5/2012 | |
| JP | 2019031618 A | | 2/2019 | |
| JP | 2019172869 A | | 10/2019 | |
| JP | 2019183018 A | * | 10/2019 | ........... C09D 11/322 |
| JP | 2020023620 A | | 2/2020 | |
| WO | 03010249 A1 | | 2/2003 | |

OTHER PUBLICATIONS

Nakajima et al, JP 2019183018 Machine Translation, Oct. 24, 2019 (Year: 2019).*
A First Office Action issued by the State Intellectual Property Office of China on Jan. 29, 2024, with a search report, for Chinese counterpart application No. 202180074906.6 (7 pages).
International Preliminary Report on Patentability, dated May 30, 2023, for corresponding international application PCT/JP2021/031822 (1 page).
Notification Concerning Transmittal of International Preliminary Report on Patentability, mailed Jun. 8, 2023, for corresponding international application PCT/JP2021/031822 (1 page).
Notification of Transmittal of Translation of the International Preliminary Report on Patentability, mailed Jun. 8, 2023, for corresponding international application PCT/JP2021/031822 (1 page).
Written Opinion of the International Searching Authority, mailed Sep. 21, 2021, for corresponding international application PCT/JP2021/031822 (3 pages).
International Search Report (ISR) mailed Sep. 21, 2021, issued for International application No. PCT/JP2021/031822. (2 pages).

* cited by examiner

*Primary Examiner* — Jessica Whiteley
(74) *Attorney, Agent, or Firm* — Law Office of Katsuhiro Arai

(57) ABSTRACT

An active energy ray-curable inkjet ink composition, except a certain photocurable inkjet printing ink composition, satisfies: (A) a polyfunctional amine-modified oligomer is contained by to 14.0% by mass; (B) monofunctional monomers are contained by 50.0% by mass or more; (C) a monofunctional monomer with a glass transition temperature of 20° C. or higher is contained by 30.0% by mass or more; (D) a monofunctional monomer with a glass transition temperature of or lower is contained by 20.0% by mass or more; (E) a polyfunctional monomer with a glass transition temperature of 10° C. or lower is contained by 3.0 to 12.0% by mass; and (F) a nitrogen-containing monofunctional monomer is contained by 30.0 to 50.0% by mass.

4 Claims, No Drawings

ACTIVE ENERGY RAY-CURABLE INKJET INK COMPOSITION

CROSS-REFERENCE TO RELATED APPLICATIONS

This application is the U.S. National Phase under 35 U.S.C. § 371 of International Application PCT/JP2021/031822, filed Aug. 31, 2021, which claims priority to Japanese Patent Application No. JP2020-195510, filed Nov. 25, 2020. The International Application was published under PCT Article 21 (2) in a language other than English.

TECHNICAL FIELD

The present invention relates to an active energy ray-curable inkjet ink composition.

BACKGROUND ART

As described in Patent Literature 1, active energy ray-curable inkjet printing ink compositions containing monofunctional and/or polyfunctional photopolymerizable compounds and oligomers are known.

According to such active energy ray-curable inkjet printing ink compositions, excellent effects are achieved in various aspects such as preservation stability, curability, and tackiness; however, their usability on various types of base materials is not yet confirmed, and the studies have not covered whether or not they can be used on base materials other than polycarbonate and polyvinyl chloride, and whether or not they can improve the hardness, rub resistance, and water resistance of the cured coating film.

As active energy ray-curable inkjet ink compositions, they are not intended to be usable on more varieties of base materials, or to make the cured film harder as well as rub-resistant and water-resistant for use in broader situations.

As a result, they may not be able to fully support base material applications where an active energy ray-curable inkjet ink composition will be used to form a film, or in certain use environments.

BACKGROUND ART LITERATURE

Patent Literature

Patent Literature 1: Japanese Patent Laid-open No. 2019-31618

SUMMARY OF THE INVENTION

Problems to be Solved by the Invention

An object of the present invention is to provide an active energy ray-curable inkjet ink composition that can form a film having excellent adhesion property on various types of base materials and can be cured with LEDs, wherein its cured film also offers high hardness as well as excellent rub resistance and water resistance.

Means for Solving the Problems

As a result of studying in earnest to achieve the aforementioned object, the inventors of the present invention found that the aforementioned object could be achieved by a specific composition, and eventually completed the present invention.

Specifically, the present invention is as described below.

1. An active energy ray-curable inkjet ink composition satisfying all of requirements (A) to (F) below:
   - (A) a polyfunctional amine-modified oligomer is contained by 0.2 to 14.0% by mass in the total quantity of all polymerizable components;
   - (B) monofunctional monomers are contained by 50.0% by mass or more in the total quantity of all polymerizable components;
   - (C) a monofunctional monomer with a glass transition temperature of 20° C. or higher is contained by 30.0% by mass or more in the total quantity of all polymerizable components;
   - (D) a monofunctional monomer with a glass transition temperature of 10° C. or lower is contained by 20.0% by mass or more in the total quantity of all polymerizable components;
   - (E) a polyfunctional monomer with a glass transition temperature of 10° C. or lower is contained by 3.0 to 12.0% by mass in the total quantity of all polymerizable components; and
   - (F) a nitrogen-containing monofunctional monomer is contained by 30.0 to 50.0% by mass in the total quantity of all polymerizable components.

(However, the following case is excluded:

A photocurable inkjet printing ink composition satisfying requirements A to E:
   - A. 3,3,5-trimethylcyclohexyl acrylate is contained by 5 to 50% by mass in all photopolymerizable compounds;
   - B. a polyfunctional monomer and/or polyfunctional oligomer with a glass transition temperature of 10° C. or lower are/is contained by 1 to 15% by mass in all photopolymerizable compounds;
   - C. monofunctional monomers are contained by a total of 40% by mass or more in all photopolymerizable compounds;
   - D. an amino group and/or amide group-containing monomer and/or oligomer are/is contained; and
   - E. a viscosity of the ink composition is 10 mPa·s or lower at 25° C.)
2. The active energy ray-curable inkjet ink composition according to 1, wherein the polyfunctional amine-modified oligomer (A) is a bifunctional amine-modified oligomer and its viscosity is at 25° C. is 2000 cps or lower.
3. The active energy ray-curable inkjet ink composition according to 1 or 2, wherein the nitrogen-containing monofunctional monomer comprises at least one type selected from the group that consists of acryloyl morpholine, vinyl methyl oxazolidinone, vinyl caprolactam, and N,N-dimethylacrylamide.

Effects of the Invention

According to the present invention, an active energy ray-curable inkjet ink composition can be obtained that can form a film having excellent adhesion property on various types of base materials and can be cured with LEDs, wherein its cured film also offers high hardness as well as excellent rub resistance and water resistance.

MODE FOR CARRYING OUT THE INVENTION

The active energy ray-curable inkjet ink composition proposed by the present invention contains polymerizable components that will cure when irradiated with an active energy ray. It also satisfies each of requirements A to F above which will be explained in order below.

It should be noted that components that are part of two or more of the requirements are included redundantly in the respective requirements.

<A. Polyfunctional Amine-Modified Oligomer>

The polyfunctional amine-modified oligomer in the present invention is a polyfunctional oligomer having amino groups.

For such polyfunctional amine-modified oligomer, CN501, CN503, CN550, CN373, CN383, CN384, and CN371NS manufactured by Sartomer Inc., EBECRYL 80, EBECRYL 81, EBECRYL 83. and EBECRYL 7100 manufactured by Daicel-Allnex Ltd., LAROMER PO 83F and LAROMER PO 84F manufactured by BASF SE, AgiSyn 001, AgiSyn 002, AgiSyn 003, AgiSyn 005, AgiSyn 006, AgiSyn 007, and AgiSyn 008 manufactured by DSM-AGI Corporation, and the like may be used.

In particular, oligomers having two photopolymerizable functional groups in the molecule are preferred, and those whose photopolymerizable functional groups are (meth) acryloyl groups are more preferred.

The content of polyfunctional amine-modified oligomer is 0.2 to 14.0% by mass in the total quantity of all polymerizable components in the active energy ray-curable inkjet ink composition. In particular, it is preferably 1.0% by mass or more, or more preferably 3.0% by mass or more, or yet more preferably 5.0% by mass or more. Meanwhile, it is preferably 12.0% by mass or less, or more preferably 10.0% by mass or less. If the content is under 0.2% by mass, there is a possibility that the curability and tackiness will drop. If the content exceeds 14.0% by mass, the viscosity will become too high.

Selecting, of the polyfunctional amine-modified oligomer, one whose viscosity at 25° C. is 2000 cps or lower is essential in keeping the viscosity of the active energy ray-curable inkjet ink composition as a whole to an appropriate range.

<B. Monofunctional Monomers>

The monofunctional monomers contained in the active energy ray-curable inkjet ink composition proposed by the present invention may be those listed below.

Butyl meth(acrylate), isobutyl (meth)acrylate, tertiary butyl (meth)acrylate, isoamyl (meth)acrylate, octyl (meth) acrylate, isodecyl (meth)acrylate, isooctyl (meth)acrylate, tridecyl (meth)acrylate, 2-ethylhexyl (meth)acrylate, decyl (meth)acrylate, isotetradecyl (meth)acrylate, isomyristyl (meth)acrylate, stearyl (meth)acrylate, isostearyl (meth) acrylate, isobornyl (meth)acrylate, lauryl (meth)acrylate, cyclic trimethylolpropane formal (meth)acrylate, cyclohexyl (meth)acrylate, butylcyclohexyl acrylate, trimethylcyclohexyl acrylate, adamantyl (meth)acrylate, dicyclopentanyl (meth)acrylate, dicyclopentenyl (meth)acrylate and other acrylates, benzyl (meth)acrylate, 2-phenoxyethyl (meth) acrylate and ethylene oxide-modified products thereof, ethyl carbitol (meth)acrylate, 2-methoxyethyl (meth)acrylate, 4-hydroxybutyl (meth)acrylate, polyethylene glycol (meth) acrylate, 2-ethylhexyl carbitol (meth)acrylate, hydroxymethyl (meth)acrylate, hydroxyethyl (meth)acrylate, hydroxypropyl (meth)acrylate, hydroxybutyl (meth)acrylate, 2-hydroxy-3-phenoxypropyl (meth)acrylate, 2-(2-ethoxyethoxy)ethyl acrylate, 2-ethylhexyl-diglycol (meth)acrylate, 2-acryloyloxyethyl hexahydrophthalate, butoxyethyl acrylate, ethoxydiethylene glycol (meth)acrylate, diethylene glycol monoethyl ether (meth)acrylate, caprolactone (meth) acrylate, ethyl carbitol (meth)acrylate, methoxydiethylene glycol (meth)acrylate, methoxytriethylene glycol (meth) acrylate, 2-ethylhexyl-diglycol acrylate, phenoxydiethylene glycol (meth)acrylate, methoxypolyethylene glycol (meth) acrylate, methoxypropylene glycol (meth)acrylate, methoxydipropylene glycol (meth)acrylate, tetrahydrofurfuryl (meth)acrylate, (2-methyl-2-ethyl-1,3-dioxolane-4-yl) methyl (meth)acrylate, (3-ethyloxetane-3-yl)methyl methacrylate, phenol ethylene glycol-modified acrylate, 2-hydroxypropyl (meth)acrylate, ethoxyphenyl acrylate (EO 2 mol), ethoxyphenyl acrylate (EO 1 mol), 2-acryloyloxyethyl succinate, 2-acryloyloxyethyl phthalate, 2-acryloyloxyethyl-2-hydroxyethyl-phthalate, lactone-modified flexible acrylate, t-butylcyclohexyl (meth)acrylate, vinyloxyethoxyethyl (meth)acrylate, EO (ethylene oxide)-modified succinic acid (meth)acrylate, cyclic trimethylolpropane formal acrylate, acryloyl morpholine, acrylonitrile, acrylamide, diethylacrylamide, styrene, (meth)acrylic acid, etc.

These monofunctional monomers are contained in the active energy ray-curable inkjet ink composition primarily for the purpose of lowering the viscosity, where they are contained by 50.0% by mass or more, or preferably 70.0% by mass or more, or more preferably 80.0% by mass or more, or yet more preferably 85.0% by mass or more, or most preferably 90.0% by mass or more, in the total quantity of all polymerizable components in the active energy ray-curable inkjet ink composition.

In addition, preferably monofunctional monomers having an amide structure are contained, and more preferably acryloyl morpholine, vinyl caprolactam, acrylamide, and diethylacrylamide are contained. Dimethylacrylamide may or may not be contained.

The content of monofunctional monomers having an amide structure is preferably by mass or more, or more preferably 30.0% by mass or more, or yet more preferably 35.0% by mass or more, or most preferably 38.0% by mass or more, in the total quantity of all polymerizable components in the active energy ray-curable inkjet ink composition. Meanwhile, it is preferably 60.0% by mass or less, or more preferably by mass or less, or yet more preferably 48.0% by mass or less, or most preferably 46.0% by mass or less.

Among the monofunctional monomers having an amide structure, it is more preferable that acryloyl morpholine is contained. The content of acryloyl morpholine is preferably 5.0% by mass or more, or more preferably 10.0% by mass or more, or yet more preferably 15.0% by mass or more, or most preferably 20.0% by mass or more, in the total quantity of all polymerizable components in the active energy ray-curable inkjet ink composition. Meanwhile, it is preferably 40.0% by mass or less, or more preferably by mass or less, or yet more preferably 32.0% by mass or less, or most preferably by mass or less.

Among the monofunctional monomers having an amide structure, it is also more preferable that vinyl caprolactam is contained. The content of vinyl caprolactam is preferably 5.0% by mass or more, or more preferably 10.0% by mass or more, or yet more preferably 13.0% by mass or more, or most preferably 15.0% by mass or more, in the total quantity of all polymerizable components in the active energy ray-curable inkjet ink composition. Meanwhile, it is preferably 25.0% by mass or less, or more preferably 22.0% by mass or less, or yet more preferably 20.0% by mass or less, or most preferably 18.0% by mass or less.

Furthermore, the ratio by mass of acryloyl morpholine contained relative to vinyl caprolactam, or acryloyl morpholine/vinyl caprolactam, is preferably 1.00 or higher, or more preferably 1.10 or higher, or yet more preferably 1.20 or higher, or most preferably 1.30 or higher. Meanwhile, it is preferably 2.20 or lower, or more preferably 2.00 or lower, or yet more preferably 1.80 or lower. When this ratio is 1.00 or higher, further improvement in curability can be facilitated while other effects remain excellent. If this ratio exceeds 2.20, the viscosity of the active energy ray-curable inkjet ink composition will increase and its handling may become difficult.

<C. Monofunctional Monomer with Glass Transition Temperature of 20° C. or Higher>

Of the aforementioned monofunctional monomers, a monofunctional monomer with a glass transition temperature of 20° C. or higher is selected and contained by 30.0% by mass or more in the total quantity of all polymerizable components in the active energy ray-curable inkjet ink composition. In particular, it is contained by preferably 35.0% by mass or more, or more preferably 38.0% by mass or more, or yet more preferably 40.0% by mass or more, or most preferably 45.0% by mass or more. Meanwhile, it is contained by preferably 70.0% by mass or less, or more preferably 65.0% by mass or less, or yet more preferably 60.0% by mass or less, or most preferably 55.0% by mass or less.

Among the monofunctional monomers with a glass transition temperature of 20° C. or higher, the aforementioned monofunctional monomers having an amide structure, as well as compounds having a cyclic structure, are preferred and, besides the monofunctional monomers with an amide structure, isobornyl (meth)acrylate and cyclic trimethylolpropane formal acrylate, in particular, are more preferred.

Also, among the monofunctional monomers with a glass transition temperature of or higher, those with a glass transition temperature of 50° C. or higher are preferred, while those with a glass transition temperature of 70° C. or higher are more preferred.

It should be noted that 3,3,5-trimethylcyclohexyl acrylate may or may not be contained.

<D. Monofunctional Monomer with Glass Transition Temperature of 10° C. or Lower>

Of the aforementioned monofunctional monomers, a monofunctional monomer with a glass transition temperature of 10° C. or lower is selected and contained by 20.0% by mass or more in the total quantity of all polymerizable components in the active energy ray-curable inkjet ink composition. In particular, it is contained by preferably 25.0% by mass or more, or more preferably 30.0% by mass or more, or yet more preferably 33.0% by mass or more, or most preferably 35.0% by mass or more. Meanwhile, it is contained by preferably 60.0% by mass or less, or more preferably 55.0% by mass or less, or yet more preferably 50.0% by mass or less, or most preferably 45.0% by mass or less.

Also, among the monofunctional monomers with a glass transition temperature of or lower, those with a glass transition temperature of −30° C. or lower are preferred, while those with a glass transition temperature of −50° C. or lower are more preferred.

<E. Polyfunctional Monomer with Glass Transition Temperature of 10° C. or Lower>

The polyfunctional monomer with a glass transition temperature of 10° C. or lower is a compound having multiple carbon-carbon unsaturated bonds in the molecule, and the following compounds may be adopted, for example:

Trimethylolpropane tri(meth)acrylate, dipropylene glycol diacrylate, vinyloxyethoxyethyl (meth)arylate, ethoxylated (3) trimethylolpropane triacrylate (Tg: −45° C.), propoxylated (3) trimethylolpropane triacrylate (Tg: −15° C.), EO (10 mol or 20 mol)-modified bisphenol A diacrylate, polyethylene glycol (400) di(meth)acrylate, polyethylene glycol (600) diacrylate, alkoxylated hexanediol diacrylate.

The polyfunctional monomer with a glass transition temperature of 10° C. or lower is contained by 3.0% by mass or more in the total quantity of all polymerizable components in the active energy ray-curable inkjet ink composition. It may be contained by 5.0% by mass or more, or 7.0% by mass or more. Meanwhile, it is contained by 12.0% by mass or less, wherein it may be contained by 11.0% by mass or less, or 9.0% by mass or less.

If the content of polyfunctional monomer with a glass transition temperature of or lower is less than 3.0% by mass, the coating film will not become hard, leading to poor pencil hardness, rub resistance, and water resistance. Meanwhile, a content exceeding 12.0% by mass will result in poor adhesion property on various types of base materials.

Also, among the polyfunctional monomers with a glass transition temperature of or lower, those with a glass transition temperature of −20° C. or lower are preferred, while those with a glass transition temperature of −30° C. or lower are more preferred.

It should be noted that α,β-unsaturated ether monomers may or may not be contained.

<F. Nitrogen-Containing Monofunctional Monomer>

For the nitrogen-containing monofunctional monomer, any compound selected from the following group may be adopted, for example:

Acryloyl morpholine, vinyl methyl oxazolidinone, vinyl caprolactam, N,N-dimethylacrylamide, acrylonitrile, (meth) acrylamide, diethylacrylamide, N-vinylcarbazole, N-vinylacetamide, N-vinylpyrrolidone, N-hydroxymethyl(meth) acrylamide, diacetone acrylamide, N,N-dimethyl(meth) acrylamide, N,N-diethyl(meth)acrylamide, lactone-modified flexible acrylate.

The nitrogen-containing monofunctional monomer is contained by 30.0% by mass or more in the total quantity of all polymerizable components in the active energy ray-curable inkjet ink composition. Additionally, it is contained by preferably 33.0% by mass or more, or more preferably 35.0% by mass or more. Meanwhile, it is contained by 50.0% by mass or less, or preferably 48.0% by mass or less, or more preferably 45.0% by mass or less, or yet more preferably 40.0% by mass or less.

<Photopolymerization Initiator>

Photopolymerization initiators that can be blended in the active energy ray-curable inkjet ink composition proposed by the present invention are not limited in any specific way.

Photopolymerization initiators that can be used include the following, for example; however, preferably photopolymerization initiators that will color the coating film by causing it to turn yellow, etc., over time are not used: bis(2,4,6-trimethylbenzoyl)phenylphosphine oxide (Irgacure 81), ethoxy(2,4,6-trimethylbenzoyl)phenylphosphine oxide, benzophenone, diethylthioxanthone, 2-methyl-1-(4-methylthio)phenyl-2-morpholinopropan-1-one, 4-benzoyl-4'-methyldiphenyl sulfide, 1-chloro-4-propoxythioxanthone, isopropylthioxanthone, 2-hydroxy-2-methyl-1-phenylpropan-1-one, 1-hydroxycyclohexyl phenyl ketone, bis-2,6-dimethoxybenzoyl-2,4,4-trimethylpentylphosphine oxide, 1-[4-(2-hydroxyethoxy)-phenyl]-2-hydroxy-2-methyl-1-propan-1-one, 2,2-dimethyl-2-hydroxyacetophenone, 2,2-dimethoxy-2-phenylacetophenone, 2,4,6-trimethylbenzyl-diphenylphosphine oxide, 2-benzyl-2-dimethylamino-1-(morpholinophenyl)-butan-1-one, etc.

The content of photopolymerization initiator in the active energy ray-curable inkjet ink composition proposed by the present invention is not limited in any specific way, but it is preferably 0.3 to 1.5% by mass, where, in particular, it is more preferably 0.4% by mass or more and more preferably 0.8% by mass or less, relative to the total quantity of all polymerizable components.

<Sensitizer>

In the active energy ray-curable inkjet ink composition proposed by the present invention, a sensitizer (compound) that has light absorbing properties primarily in the ultraviolet ray wavelength range of 400 nm and higher and manifests a function to sensitize the curing reaction under light having wavelengths in this range, may be used. It may not be used if sufficient curing is possible. It should be noted that "manifests a function to sensitize . . . under light having wavelengths in this range (400 nm and higher)" above means having light absorbing properties in the wavelength range of 400 nm and higher. By using such sensitizer, the active energy ray-curable inkjet ink composition proposed by the present invention can have improved LED curability.

The aforementioned sensitizer may be an anthracene-based sensitizer, thioxanthone-based sensitizer, etc. Among them, a thioxanthone-based sensitizer is preferred. Any of these sensitizers may be used alone, or two or more types may be used together.

Specific examples include 9,10-dipropoxyanthracene, 9,10-bis(2-ethylhexyloxy) anthracene and other anthracene-based sensitizers, as well as 2,4-diethylthioxanthone, 2-isopropyl thioxanthone, 4-isopropylthioxanthone and other thioxanthone-based sensitizers. Representative examples of commercial products include DBA and DEA (manufactured by Kawasaki Kasei Chemicals Ltd.) for anthracene-based sensitizers, and DETX and ITX (manufactured by Lambson Ltd.) for thioxanthone-based sensitizers, for example.

Preferably the content of sensitizer is in a range of 0 to 8.0% by mass relative to the total quantity of all polymerizable components. A content exceeding 8.0% by mass is not desirable because it represents an excessive addition that no longer leads to improvement in effects.

It should be noted that, if a thioxanthone-based sensitizer is used as the sensitizer, the active energy ray-curable inkjet printing ink composition tends to turn yellow and take on a hue that is yellower than the color based on the pigment (inherent hue), and therefore preferably the content of thioxanthone-based sensitizer is determined as deemed appropriate for each color.

To be specific, preferably white ink compositions and clear ink compositions that are more easily affected by a change in color tone do not contain any thioxanthone-based compound as the sensitizer. Also, preferably magenta ink compositions and cyan ink compositions that present problems if a change in hue occurs use a thioxanthone-based compound only to the extent that doing so does not cause problems with the hue. Also, preferably black ink compositions and yellow ink compositions use a thioxanthone-based compound as an additional sensitizer because their hue is not affected by a color change and their photopolymerizability is lower compared to ink compositions of other hues.

<Colorant>

A colorant of each hue may be contained in the active energy ray-curable inkjet printing ink composition proposed by the present invention, to obtain an active energy ray-curable inkjet printing ink composition of each color.

For such colorant, any pigment or dye traditionally used in standard active energy ray-curable inkjet printing ink compositions may be used without any specific limitation; when lightfastness is considered, however, pigments such as organic pigments and inorganic pigments are preferred.

Organic pigments include, for example, dye rake pigments as well as azo-based, benzimidazolone-based, phthalocyanine-based, quinacridone-based, anthraquinone-based, dioxazine-based, indigo-based, thioindigo-based, perylene-based, perinone-based, diketopyrrolopyrrole-based, isoindolinone-based, nitro-based, nitroso-based, flavanthrone-based, quinophthalone-based, pyranthrone-based, indanthrone-based pigments, and the like. Inorganic pigments include carbon black, titanium oxide, red iron oxide, graphite, iron black, chrome oxide green, aluminum hydroxide, etc.

Also, specific examples of pigments for the active energy ray-curable inkjet printing ink composition proposed by the present invention are listed below by each representative hue.

First, yellow pigments for using the present invention as a yellow active energy ray-curable inkjet printing ink composition include, for example, C. I. Pigment Yellow 1, 2, 3, 12, 13, 14, 16, 17, 42, 73, 74, 75, 81, 83, 87, 93, 95, 97, 98, 108, 109, 114, 120, 128, 129, 138, 139, 150, 151, 155, 166, 180, 184, 185, 213, etc., of which C. I. Pigment Yellow 150, 155, 180, 213, etc., are preferred.

Magenta pigments for using the present invention as a magenta active energy ray-curable inkjet printing ink composition include, for example, C. I. Pigment Red 5, 7, 12, 22, 38, 48:1, 48:2, 48:4, 49:1, 53:1, 57, 57:1, 63:1, 101, 102, 112, 122, 123, 144, 146, 149, 168, 177, 178, 179, 180, 184, 185, 190, 202, 209, 224, 242, 254, 255, 270, C. I. Pigment Violet 19, etc., of which C. I. Pigment Red 122, 202, C. I. Pigment Violet 19, etc., are preferred.

Cyan pigments for using the present invention as a cyan active energy ray-curable inkjet printing ink composition include, for example, C. I. Pigment Blue 1, 2, 3, 15, 15:1, 15:2, 15:3, 15:4, 15:6, 16, 18, 22, 27, 29, 60, etc., or which C. I. Pigment Blue 15:4, etc., are preferred.

Black pigments for using the present invention as a black active energy ray-curable inkjet printing ink composition include, for example, carbon black (C. I. Pigment Black 7), etc.

White pigments for using the present invention as a white active energy ray-curable inkjet printing ink composition include, for example, titanium oxide, aluminum oxide, etc., or which titanium oxide that has been surface-treated with alumina, silica or various other materials is preferred.

Preferably the content of pigment in the active energy ray-curable inkjet printing ink composition proposed by the present invention is 1 to 20% by mass relative to the total mass of active energy ray-curable inkjet printing ink composition. If the content of pigment is under 1% by mass, the image quality of obtained printed matters tends to drop. If the content exceeds 20% by mass, on the other hand, the viscometric properties of the active energy ray-curable inkjet printing ink composition tend to be negatively affected.

<Pigment Dispersant>

The active energy ray-curable inkjet printing ink composition proposed by the present invention may contain a pigment dispersant as necessary.

For the pigment dispersant, which is used to improve the pigment dispersibility and the preservation stability of the ink composition proposed by the present invention, any of traditionally used pigment dispersants may be employed without any specific limitation, but use of polymer dispersants is preferred, for example. Such pigment dispersants include carbodiimide-based dispersants, polyester amine-based dispersants, fatty acid amine-based dispersants, modified polyacrylate-based dispersants, modified polyurethane-based dispersants, multi-chain polymer nonionic dispersants, polymer ion activators, etc. Any of these pigment dispersants may be used alone, or two or more types may be mixed together and used.

Preferably the aforementioned pigment dispersant is contained by 1 to 200 parts by mass when the total quantity of all pigments used represents 100 parts by mass. If the content of pigment dispersant is under 1 part by mass, the pigment dispersibility and the storage stability of the ink composition proposed by the present invention may drop. In the meantime, while the pigment dispersant may be contained by over 200 parts by mass, doing so may not produce any difference in terms of effects. A more preferred lower limit is 5 parts by mass, while a more preferred upper limit is 60 parts by mass, for the content of pigment dispersant.

<Surfactant>

To improve its discharge stability, preferably the active energy ray-curable inkjet printing ink composition proposed by the present invention contains a silicone-based surfactant or other surfactants traditionally used in active energy ray-curable inkjet printing ink composition as a surfactant, according to the inkjet head being used.

Specific examples of silicone-based surfactants include polyether-modified silicone oil, polyester-modified polydimethylsiloxane, polyester-modified methylalkylpolysiloxane, etc. Any of these may be used alone, or two or more types may be used together.

Preferably the content of surfactant in the ink composition proposed by the present invention is 0.005 to 1.0% by mass. If it is under 0.005% by mass, the surface tension of the active energy ray-curable inkjet ink composition proposed by the present invention will increase and its discharge stability from the inkjet head will drop. If it exceeds 1.0% by mass, on the other hand, more bubbles will be generated in the active energy ray-curable inkjet ink composition and its discharge stability will drop.

<Additives>

Various types of additives may be added to the active energy ray-curable inkjet ink composition proposed by the present invention, as necessary, to manifest various functionalities. To be specific, these additives include surface conditioner, photostabilizer, surface treatment agent, antioxidant, antiaging agent, crosslinking promoter, polymerization inhibitor, plasticizer, preservative, pH adjusting agent, defoaming agent, humectant, etc. Also, non-curable resins that function as a vehicle may or may not be blended in. Also, solvents may or may not be contained.

(Surface Conditioner)

Suitably the active energy ray-curable inkjet ink composition contains a surface conditioner. The surface conditioner is not limited in any specific way. For example, the surface conditioner may be a silicone-based surface conditioner, fluorine-based surface conditioner, acetylene-based surface conditioner, etc. Acetylene-based surface conditioners include DYNOL 607, DYNOL 609, EXP-4001, EXP-4300, and OLFIN E1010 (manufactured by Nissin Chemical Co., Ltd.), for example. Silicone-based surfactants include BYK-307, 333, 347, 348, 349, 345, 377, 378, and 3455 (manufactured by BYK-Chemie GmbH), for example. Fluorine-based surfactants include F-410, 444, 553 (manufactured by DIC Corporation), FS-65, 34, 35, 31, and 30 (manufactured by DuPont de Nemours, Inc.), for example.

When a surface conditioner is contained, the content of surface conditioner is not limited in any specific way. For example, the content of surface conditioner is preferably a quantity that will bring the surface tension of the ink composition to a range suitable for forming of coating film, or more preferably 0.1 to 1.5% by mass in the ink composition.

(Polymerization Inhibitor)

The polymerization inhibitor is not limited in any specific way. For example, the polymerization inhibitor may be a N—$CH_3$ type, N—H type, N—OR type or other hindered amine, or phenol-based, amine-based, sulfur-based, phosphorous-based, or other polymerization inhibitor.

(Defoaming Agent)

The defoaming agent may be a silicone-based defoaming agent, Pluronic (registered trademark)-based defoaming agent, etc.

(Polyfunctional Monomers with Glass Transition Temperature Exceeding 10° C.)

To the extent that doing so will not impair the effects of the present invention, polyfunctional monomers with a glass transition temperature exceeding 10° C. may be contained in the active energy ray-curable inkjet ink composition.

Such polyfunctional monomers include those listed below, for example. If they are contained by a large quantity, poor adhesion property to the base material will result.

Ethylene glycol di(meth)acrylate, propylene glycol di(meth)acrylate, butanediol di(meth)acrylate, hexanediol di(meth)acrylate, dipropylene glycol dimethacrylate, triethylene glycol di(meth)acrylate, tripropylene glycol di(meth) acrylate, 1,9-nonanediol di(meth)acrylate, neopentyl glycol di(meth)acrylate, dimethylol-tricyclodecane di(meth)acrylate, hydroxypivalic acid neopentyl glycol di(meth)acrylate, polytetramethylene glycol diacrylate, trimethylolpropane tri (meth)acrylate and ethylene oxide-modified products thereof, pentaerythritol tri(meth)acrylate, pentaerythritol tetra(meth)acrylate and ethylene oxide-modified products thereof, dipentaerythritol penta(meth)acrylate and ethylene oxide-modified products thereof, dipentaerythritol hexa(meth)acrylate and ethylene oxide-modified products thereof, urethane (meth)acrylate, epoxy (meth)acrylate, polyester (meth)acrylate, pentaerythritol ethoxy tetraacrylate, caprolactam-modified dipentaerythritol hexaacrylate, ethoxylated bisphenol A diacrylate, alkoxylated tetrahydrofurfuryl acrylate, etc.

<Physical Properties of Active Energy Ray-Curable Inkjet Ink Composition Proposed by Present Invention>

Preferably the active energy ray-curable inkjet printing ink composition proposed by the present invention has a viscosity at 25° C. of 10.0 cps or lower. To elaborate on this in greater detail, the active energy ray-curable inkjet ink composition may be designed to have a specific viscosity so that the ink composition can be adapted to each inkjet device.

It should be noted that, in this Specification, the term “viscosity” refers to a viscosity measured using a type-E viscometer (product name: RE100L Viscometer, manufactured by Toki Sangyo Co., Ltd.) under the conditions of 25° C. and 20 rpm.

In addition, preferably the surface tension is 20.0 to 25.0 mN/m.

(Manufacturing of Active Energy Ray-curable Inkjet Ink Composition)

Next, how the active energy ray-curable inkjet ink composition proposed by the present invention is manufactured using these materials is explained.

The active energy ray-curable inkjet ink composition proposed by the present invention can be obtained by dispersing and mixing the ingredients using a wet circulation mill, bead mill, ball mill, sand mill, attritor, roll mill, DCP mill, agitator, Henschel mixer, colloid mill, ultrasonic homogenizer, high-pressure homogenizer (Microfluidizer, Nanomizer, Ultimizer, Genus Py, DeBEE 2000, etc.), pearl mill or other dispersion machine, for example, and adjusting the viscosity of the active energy ray-curable inkjet ink composition as necessary.

By formulating it to contain specified quantities of specific photopolymerizable components as mentioned above, active energy ray-curable inkjet printing ink composition proposed by the present invention becomes one offering excellent curability under ultraviolet ray, particularly ultraviolet ray from a light-emitting diode (LED) light source, good adhesion property and abrasion resistance with respect to acrylic resin, polystyrene, vinyl chloride, polycarbonate and other base materials, excellent discharge stability and storage stability, as well as excellent safety in all aspects such as high flashpoint, low skin irritability, and low odor.

The method for preparing the ink composition proposed by the present invention is not limited in any specific way, and it can be prepared by adding all of the aforementioned materials and mixing them in a bead mill, triple-roll mill, etc.

It should be noted that the ink composition proposed by the present invention can also be prepared by obtaining a concentrated base ink beforehand by mixing the pigment, pigment dispersant, and photopolymerizable components, and then adding to this concentrated base ink the photopolymerizable components, photopolymerization initiator, and, if necessary, additives such as surfactant, to achieve a desired chemical makeup of active energy ray-curable inkjet ink composition.

Preferably the base material on which to print the ink composition proposed by the present invention is acrylic resin, vinyl chloride, polystyrene, polycarbonate, etc.; however, the ink composition can be printed on any base materials without problems so long as they are base materials traditionally printed with active energy ray-curable inkjet ink compositions (paper, plastic film, capsules, gel, metal foil, glass, fabric, etc.).

The method for printing and curing the ink composition proposed by the present invention may specifically be a method whereby the ink composition proposed by the present invention is discharged onto a base material from an inkjet head, after which the coating film of the ink composition proposed by the present invention that has landed on the base material is exposed to light and thereby cured.

For example, discharge onto the base material (printing of images) may be implemented by supplying the ink composition proposed by the present invention to a low-viscosity-compatible printer head of an inkjet recording printer, and then discharging the ink composition from the printer head in such a way that the coating film on the base material will have a film thickness of 1 to 60 μm, for example. Also, exposure to light and curing (curing of images) may be implemented by irradiating light onto the coating film of the ink composition proposed by the present invention that has been applied on the base material as images.

For the inkjet recording printer device with which to print the ink composition proposed by the present invention, any conventionally used inkjet recording printer device may be utilized. It should be noted that, if a continuous-type inkjet recording printer device is used, a conductivity-adding agent is further added to the ink composition proposed by the present invention to adjust its conductivity.

The light source used in the aforementioned curing of the coating film may be ultraviolet ray (UV-lamp), ultraviolet ray (light-emitting diode (LED)), electron beam, visible light, etc., where a light-emitting diode (LED) that generates ultraviolet ray with an emission peak wavelength in a range of 350 to 420 nm is preferred from an environmental aspect.

Ultraviolet ray from a light-emitting diode (LED) light source refers to "light irradiated from a light-emitting diode that generates ultraviolet ray with an emission peak wavelength in a range of 350 to 420 nm."

EXAMPLES

The present invention is explained in greater detail below by citing examples, but the present invention is not limited to these examples. It should be noted that, unless otherwise specified, "%" and "part" refer to "% by mass" and "part by mass," respectively.

The materials used in the following Examples and Comparative Examples are listed below. In the Tables, the unit of values in the fields relating to pigments, dispersants, resins, solvents, and totals is "% by mass."

(Viscosity of Composition)

The active energy ray-curable inkjet ink compositions obtained in the Examples and Comparative Examples were measured for viscosity (cps) using a type-E viscometer (product name: RE100L Viscometer, manufactured by Toki Sangyo Co., Ltd.) under the conditions of 25° C. in temperature and 20 rpm in rotor speed.

(Surface Tension)

Each active energy ray-curable inkjet ink composition was measured for surface tension at a temperature of 25° C. using a dynamic wettability tester (product name: WET-6000) manufactured by RHESCA Co., Ltd.

(Adhesion Property)

Each active energy ray-curable inkjet ink composition was applied all over base materials made of acrylic (acrylic resin), PVC (polyvinyl chloride resin), polycarbonate resin, and PS (polystyrene), respectively, and then irradiated with ultraviolet ray and cured.

The cured coating film thus formed on each base material was cross-cut with a cutting knife into 100 small square pieces of cured coating film. A piece of cellulose tape (product name: CELLOTAPE (registered trademark), manufactured by Nichiban Co., Ltd.) was stuck over the cut area and then peeled, to count the number of small square pieces remaining on the base material without adhering to the cellulose tape and separating. For example, "100/100" indicates that all of the small pieces remain on the base material without any single piece separating, while "20/100" indicates that 20 small pieces remain on the base material but 80 small pieces have adhered to the cellulose tape and separated.

(Pencil Hardness)

Each cured coating film was evaluated by the pencil scratch test (pencil hardness) according to JIS K5600-5-4.

(Rub Resistance)

Using a Gakushin-type rubbing tester (manufactured by Daiei Kagaku Seiki Mfg. Co., Ltd.), each cured coating film was rubbed 200 times with a bleached cloth under a load of 500 g, to visually observe how much of the cured film is removed from the precoated K-liner/C-liner and evaluate rub resistance according to the evaluation criteria below:

○: The cured film is not removed.

Δ: Scratch marks are left on the cured film.

x: The cured film is removed and the sheet becomes visible.

(Water Resistance)

Each cured coating film was rubbed 20 times with a moistened cotton swab, after which the condition of the printed matter was observed to evaluate water resistance according to the evaluation criteria below:

○: The print is not blurred.

Δ: The print is slightly blurred, but the letters are clearly legible.

x: The print is blurred and the letters are not legible.

(LED Curability)

An inkjet recording device and each active energy ray-curable inkjet ink composition were let stand for 24 hours at an ambient temperature of 25° C., to bring the temperatures of the inkjet recording device and ink composition to 25° C. Thereafter, at the active energy ray-curable inkjet ink composition was printed (printing characters) continuously on a PVC sheet, after which the ink composition was cured using a UV-LED lamp manufactured by Phoseon Technology with the distance between the lamp and the ink application surface adjusted to 2 cm, until the cumulative UV ray quantity reached 180 mJ/cm$^2$. The obtained cured coating film was rubbed with a cotton swab and curability was evaluated by how much of the coating film was removed.

○: Removal is not observed.

Δ: Slight removal is observed.

x: Removal is observed.

(Materials Used)

<Colorants>

Red pigment (PR122)

Yellow pigment (PY150)

Blue pigment (PB15:4)

Black pigment (PB7)

White pigment (PW6)

<Pigment Dispersants>

Pigment dispersant a (EFKA PX4701, manufactured by BASF SE)

Pigment dispersant b (SOLSPERSE 56000, manufactured by Lubrizol Japan Ltd.)

Pigment dispersant c (BYK JET9151, manufactured by BYK-Chemie GmbH)

Pigment dispersant d (PB821, manufactured by Ajinomoto Fine-Techno Co., Inc.)

<A. Polyfunctional Amine-modified Oligomers>

Polyfunctional amine-modified oligomer a (CN371NS, manufactured by Sartomer Inc.)

Polyfunctional amine-modified oligomer b (CN373, manufactured by Sartomer Inc.)

Polyfunctional amine-modified oligomer c (AgiSyn 008, manufactured by DSM-AGI Corporation)

Polyfunctional amine-modified oligomer d (AgiSyn 003, manufactured by DSM-AGI Corporation)

<C. Monofunctional Monomers with Glass Transition Temperature of 20° C. or Higher)

Isobornyl acrylate (Product name: SR506, manufactured by Sartomer Inc.) Tg=88° C.

Cyclic trimethylolpropane formal acrylate (CTFA) (Product name: SR531, manufactured by Sartomer Inc.) Tg=32° C.

<D. Monofunctional Monomers with Glass Transition Temperature of 10° C. or Lower)

Ethyl carbitol acrylate (Product name: V190, manufactured by Osaka Organic Chemical Industry Ltd.) Tg=−67° C.

Tetrahydrofurfuryl acrylate (Product name: SR285, manufactured by Sartomer Inc.) Tg=−15° C.

Benzyl acrylate (Product name: V160, manufactured by Osaka Organic Chemical Industry Ltd.) Tg=6° C.

<E. Polyfunctional Monomer with Glass Transition Temperature of 10° C. or Lower)

Ethylene oxide (3 mol)-added trimethylolpropane triacrylate ((EO) TMPTA) (Product name: SR454, manufactured by Sartomer Inc.) Tg=−40° C.

<Other Polyfunctional Monomers>

Trimethylolpropane triacrylate (Product name: SR351, manufactured by Sartomer Inc.) Tg=62° C.

Dipropylene glycol diacrylate (Product name: SR508, manufactured by Sartomer Inc.) Tg=104° C.

<F. Nitrogen-containing Monofunctional Monomers>

Acryloyl morpholine (ACMO, manufactured by KJ Chemicals Corporation) Tg=145° C.

N-vinylcaprolactam (V-CAP, manufactured by ISP Japan Ltd.) Tg=90° C.

<Photopolymerization Initiator>

TPO: 2,4,6-trimethylbenzoyl-diphenyl-phosphine oxide (manufactured by Lambson Ltd.)

<Sensitizer>

DETX: 2,4-diethylthioxanthone (manufactured by Lambson Ltd.)

<Polymerization Inhibitors>

MEHQ (Hydroquinone monomethyl ether)

UV-22: Quinone-based polymerization inhibitor (manufactured by Kromachem Ltd.)

<Leveling Agent>

BYK-377 (Solids content 100%, polyether-modified siloxane-type surfactant, manufactured by BYK-Chemie Japan K.K.)

Examples and Comparative Examples

<Manufacturing of Active Energy Ray-Curable Inkjet Ink Compositions in Examples and Comparative Examples>

The respective ingredients were mixed to achieve the compositions in the tables below, to manufacture the active energy ray-curable inkjet ink compositions.

TABLE 1-1

| | Examples | | | | | | | | | |
|---|---|---|---|---|---|---|---|---|---|---|
| | 1 | 2 | 3 | 4 | 5 | 6 | 7 | 8 | 9 | 10 |
| Yellow pigment (PY150) | | | | | | | | | | |
| Red pigment (PR122) | | | | | | | | | | |
| Blue pigment (PB15:4) | 2.00% | 2.00% | 2.00% | 2.00% | 2.00% | 2.00% | 2.00% | 2.00% | 2.00% | 2.00% |
| White pigment (PW6) | | | | | | | | | | |
| Black pigment (PB7) | | | | | | | | | | |
| Pigment dispersant a | 0.80% | 0.80% | 0.80% | 0.80% | 0.80% | 0.80% | 0.80% | 0.80% | 0.80% | 0.80% |
| Pigment dispersant b | | | | | | | | | | |
| Pigment dispersant c | | | | | | | | | | |
| Pigment dispersant d | | | | | | | | | | |

TABLE 1-1-continued

| | | Examples | | | | | | | | | |
|---|---|---|---|---|---|---|---|---|---|---|---|
| | | 1 | 2 | 3 | 4 | 5 | 6 | 7 | 8 | 9 | 10 |
| Polyfunctional amine-modified oligomer a | | 5.00% | 0.20% | 12.00% | 5.00% | 5.00% | 5.00% | 5.00% | 5.00% | 5.00% | |
| Polyfunctional amine-modified oligomer b | | | | | | | | | | | 5.00% |
| Polyfunctional amine-modified oligomer c | | | | | | | | | | | |
| Polyfunctional amine-modified oligomer d | | | | | | | | | | | |
| Ethyl carbitol acrylate | | 5.00% | 5.00% | 5.00% | 5.00% | 5.00% | 5.00% | 5.00% | | 5.00% | 5.00% |
| Tetrahydrofurfuryl acrylate | | | | | | | | | 5.00% | | |
| Benzyl acrylate | | 26.90% | 31.70% | 19.90% | 28.90% | 21.90% | 28.90% | 21.90% | 26.90% | 26.90% | 26.90% |
| Isobornyl acrylate | | 10.00% | 10.00% | 10.00% | 10.00% | 10.00% | 10.00% | 10.00% | 10.00% | | 10.00% |
| CTFA | | | | | | | | | | 10.00% | |
| (EO) TMPTA | | 5.00% | 5.00% | 5.00% | 3.00% | 10.00% | 5.00% | 5.00% | 5.00% | 5.00% | 5.00% |
| Trimethylolpropane triacrylate | | | | | | | | | | | |
| Dipropylene glycol diacrylate | | | | | | | | | | | |
| Acryloyl morpholine | | 20.00% | 20.00% | 20.00% | 20.00% | 20.00% | 18.00% | 25.00% | 20.00% | 20.00% | 20.00% |
| N-vinylcaprolactam | | 14.50% | 14.50% | 14.50% | 14.50% | 14.50% | 14.50% | 14.50% | 14.50% | 14.50% | 14.50% |
| Initiator | | 8.00% | 8.00% | 8.00% | 8.00% | 8.00% | 8.00% | 8.00% | 8.00% | 8.00% | 8.00% |
| Sensitizer | | 0.50% | 0.50% | 0.50% | 0.50% | 0.50% | 0.50% | 0.50% | 0.50% | 0.50% | 0.50% |
| Polymerization inhibitor (MEHQ) | | 1.90% | 1.90% | 1.90% | 1.90% | 1.90% | 1.90% | 1.90% | 1.90% | 1.90% | 1.90% |
| Polymerization inhibitor (UV-22) | | 0.20% | 0.20% | 0.20% | 0.20% | 0.20% | 0.20% | 0.20% | 0.20% | 0.20% | 0.20% |
| Leveling agent | | 0.20% | 0.20% | 0.20% | 0.20% | 0.20% | 0.20% | 0.20% | 0.20% | 0.20% | 0.20% |
| Total | | 100.0% | | | | | | | | | |
| Specific gravity | g/ml | 1.07 | 1.07 | 1.07 | 1.07 | 1.07 | 1.07 | 1.07 | 1.07 | 1.07 | 1.07 |
| Viscosity | cps (25° C.) | 8.1 | 6.4 | 11.1 | 7.7 | 8.8 | 7.8 | 8.8 | 7.9 | 8.6 | 7.2 |
| Surface tension | mN/m | 23.2 | 23.3 | 23.3 | 23.1 | 23.2 | 23.2 | 23.2 | 23.2 | 23.2 | 23.2 |
| Adhesion property | Acrylic | 100/100 | 100/100 | 100/100 | 100/100 | 100/100 | 100/100 | 100/100 | 100/100 | 100/100 | 100/100 |
| | PVC | 100/100 | 100/100 | 100/100 | 100/100 | 100/100 | 100/100 | 100/100 | 100/100 | 100/100 | 100/100 |
| | Polycarbonate | 100/100 | 100/100 | 100/100 | 100/100 | 100/100 | 100/100 | 100/100 | 100/100 | 100/100 | 100/100 |
| | PS | 100/100 | 100/100 | 100/100 | 100/100 | 100/100 | 100/100 | 100/100 | 100/100 | 100/100 | 100/100 |
| Resistance | Pencil hardness | 2H | 2H | 2H | 2H | 2H | 2H | 2H | 2H | 2H | 2H |
| | Rub resistance | ○ | ○ | ○ | ○ | ○ | ○ | ○ | ○ | ○ | ○ |
| | Water resistance | ○ | ○ | ○ | ○ | ○ | ○ | ○ | ○ | ○ | ○ |
| LED curability | | ○ | ○ | ○ | ○ | ○ | ○ | ○ | ○ | ○ | ○ |

TABLE 1-2

| | Examples | | | | | | | | |
|---|---|---|---|---|---|---|---|---|---|
| | 11 | 12 | 13 | 14 | 15 | 16 | 17 | 18 | 19 |
| Yellow pigment (PY150) | | | | 2.16% | | | | | |
| Red pigment (PR122) | | | 3.50% | | | | 0.80% | | |
| Blue pigment (PB15:4) | 2.00% | 2.00% | | | | 0.50% | | | |
| White pigment (PW6) | | | | | | | | | 14.00% |
| Black pigment (PB7) | | | | | 1.80% | | | 1.40% | |
| Pigment dispersant a | 0.80% | 0.80% | | | | 0.20% | 0.30% | | 1.40% |
| Pigment dispersant b | | | | 0.86% | | | | | |
| Pigment dispersant c | | | 1.60% | | | | 0.40% | | |
| Pigment dispersant d | | | | | 0.80% | | | 0.20% | |
| Polyfunctional amine-modified oligomer a | | | 0.50% | 2.50% | 3.00% | 5.00% | 2.00% | 5.00% | 0.20% |
| Polyfunctional amine-modified oligomer b | | | | | | | | | |
| Polyfunctional amine-modified oligomer c | 5.00% | | | | | | | | |
| Polyfunctional amine-modified oligomer d | | 5.00% | | | | | | | |
| Ethyl carbitol acrylate | 5.00% | 5.00% | 4.50% | 5.00% | 5.00% | 5.00% | 4.50% | 5.00% | 2.10% |
| Tetrahydrofurfuryl acrylate | | | | | | | | | |
| Benzyl acrylate | 26.90% | 26.90% | 33.16% | 27.48% | 26.50% | 28.30% | 35.25% | 27.00% | 24.70% |
| Isobornyl acrylate | 10.00% | 10.00% | 5.16% | 10.00% | 10.00% | 10.00% | 5.16% | 10.00% | 10.35% |
| CTFA | | | | | | | | | |
| (EO) TMPTA | 5.00% | 5.00% | 4.00% | 6.00% | 4.00% | 5.00% | 4.00% | 4.00% | 3.00% |
| Trimethylolpropane triacrylate | | | | | | | | | |
| Dipropylene glycol diacrylate | | | | | | | | | |
| Acryloyl morpholine | 20.00% | 20.00% | 22.26% | 20.70% | 20.00% | 21.00% | 22.76% | 20.00% | 19.00% |
| N-vinylcaprolactam | 14.50% | 14.50% | 14.50% | 14.50% | 14.50% | 14.50% | 14.50% | 14.50% | 12.00% |
| Initiator | 8.00% | 8.00% | 7.50% | 7.00% | 8.00% | 8.00% | 7.50% | 8.00% | 12.00% |

TABLE 1-2-continued

| | | Examples | | | | | | | | |
|---|---|---|---|---|---|---|---|---|---|---|
| | | 11 | 12 | 13 | 14 | 15 | 16 | 17 | 18 | 19 |
| Sensitizer | | 0.50% | 0.50% | 1.00% | 1.50% | 3.00% | 0.20% | 0.50% | 1.50% | |
| Polymerization inhibitor (MEHQ) | | 1.90% | 1.90% | 1.90% | 1.90% | 3.00% | 1.90% | 1.90% | 3.00% | 1.00% |
| Polymerization inhibitor (UV-22) | | 0.20% | 0.20% | 0.20% | 0.20% | 0.20% | 0.20% | 0.20% | 0.20% | |
| Leveling agent | | 0.20% | 0.20% | 0.20% | 0.20% | 0.20% | 0.20% | 0.20% | 0.20% | 0.20% |
| Total | | | | | | 100.0% | | | | |
| Specific gravity | g/ml | 1.07 | 1.07 | 1.07 | 1.07 | 1.07 | 1.07 | 1.07 | 1.07 | 1.17 |
| Viscosity | cps (25° C.) | 8.0 | 7.1 | 8.3 | 8.1 | 8.1 | 8.1 | 8.1 | 8.1 | 7.5 |
| Surface tension | mN/m | 23.2 | 23.2 | 23.1 | 23.0 | 23.2 | 23.3 | 23.2 | 23.1 | 23.3 |
| Adhesion property | Acrylic | 100/100 | 100/100 | 100/100 | 100/100 | 100/100 | 100/100 | 100/100 | 100/100 | 100/100 |
| | PVC | 100/100 | 100/100 | 100/100 | 100/100 | 100/100 | 100/100 | 100/100 | 100/100 | 100/100 |
| | Polycarbonate | 100/100 | 100/100 | 100/100 | 100/100 | 100/100 | 100/100 | 100/100 | 100/100 | 100/100 |
| | PS | 100/100 | 100/100 | 100/100 | 100/100 | 100/100 | 100/100 | 100/100 | 100/100 | 100/100 |
| Resistance | Pencil hardness | 2H | 2H | 2H | 2H | 2H | 2H | 2H | 2H | 2H |
| | Rub resistance | ○ | ○ | ○ | ○ | ○ | ○ | ○ | ○ | ○ |
| | Water resistance | ○ | ○ | ○ | ○ | ○ | ○ | ○ | ○ | ○ |
| LED curability | | ○ | ○ | ○ | ○ | ○ | ○ | ○ | ○ | ○ |

TABLE 1-3

| | | Comparative Examples | | | | | | | |
|---|---|---|---|---|---|---|---|---|---|
| | | 1 | 2 | 3 | 4 | 5 | 6 | 7 | 8 |
| Yellow pigment (PY150) | | | | | | | | | |
| Red pigment (PR122) | | | | | | | | | |
| Blue pigment (PB15:4) | | 2.00% | 2.00% | 2.00% | 2.00% | 2.00% | 2.00% | 2.00% | 2.00% |
| White pigment (PW6) | | | | | | | | | |
| Black pigment (PB7) | | | | | | | | | |
| Pigment dispersant a | | 0.80% | 0.80% | 0.80% | 0.80% | 0.80% | 0.80% | 0.80% | 0.80% |
| Pigment dispersant b | | | | | | | | | |
| Pigment dispersant c | | | | | | | | | |
| Pigment dispersant d | | | | | | | | | |
| Polyfunctional amine-modified oligomer a | | 0.00% | 15.00% | 5.00% | 5.00% | 5.00% | 5.00% | 5.00% | 5.00% |
| Polyfunctional amine-modified oligomer b | | | | | | | | | |
| Polyfunctional amine-modified oligomer c | | | | | | | | | |
| Polyfunctional amine-modified oligomer d | | | | | | | | | |
| Ethyl carbitol acrylate | | 5.00% | 5.00% | 5.00% | 5.00% | 5.00% | 5.00% | 5.00% | 5.00% |
| Tetrahydrofurfuryl acrylate | | | | | | | | | |
| Benzyl acrylate | | 31.90% | 16.90% | 31.90% | 16.90% | 36.90% | 11.90% | 26.90% | 26.90% |
| Isobornyl acrylate | | 10.00% | 10.00% | 10.00% | 10.00% | 10.00% | 10.00% | 10.00% | 10.00% |
| CTFA | | | | | | | | | |
| (EO) TMPTA | | 5.00% | 5.00% | 0.00% | 15.00% | 5.00% | 5.00% | | |
| Trimethylolpropane triacrylate | | | | | | | | | 5.00% |
| Dipropylene glycol diacrylate | | | | | | | | 5.00% | |
| Acryloyl morpholine | | 20.00% | 20.00% | 20.00% | 20.00% | 10.00% | 35.00% | 20.00% | 20.00% |
| N-vinylcaprolactam | | 14.50% | 14.50% | 14.50% | 14.50% | 14.50% | 14.50% | 14.50% | 14.50% |
| Initiator | | 8.00% | 8.00% | 8.00% | 8.00% | 8.00% | 8.00% | 8.00% | 8.00% |
| Sensitizer | | 0.50% | 0.50% | 0.50% | 0.50% | 0.50% | 0.50% | 0.50% | 0.50% |
| Polymerization inhibitor (MEHQ) | | 1.90% | 1.90% | 1.90% | 1.90% | 1.90% | 1.90% | 1.90% | 1.90% |
| Polymerization inhibitor (UV-22) | | 0.20% | 0.20% | 0.20% | 0.20% | 0.20% | 0.20% | 0.20% | 0.20% |
| Leveling agent | | 0.20% | 0.20% | 0.20% | 0.20% | 0.20% | 0.20% | 0.20% | 0.20% |
| Total | | | | | 100.0% | | | | |
| Specific gravity | g/ml | 1.07 | 1.07 | 1.07 | 1.07 | 1.07 | 1.07 | 1.07 | 1.07 |
| Viscosity | cps (25° C.) | 6.0 | 14.3 | 7.1 | 9.8 | 7.4 | 12.5 | 8.9 | 8.9 |
| Surface tension | mN/m | 23.2 | 23.2 | 23.1 | 23.1 | 23.2 | 23.2 | 23.2 | 23.2 |
| Adhesion property | Acrylic | 100/100 | 100/100 | 100/100 | 0/100 | 100/100 | 100/100 | 40/100 | 45/100 |
| | PVC | 100/100 | 100/100 | 100/100 | 0/100 | 100/100 | 100/100 | 30/100 | 35/100 |
| | Polycarbonate | 100/100 | 100/100 | 100/100 | 0/100 | 100/100 | 100/100 | 80/100 | 70/100 |
| | PS | 100/100 | 100/100 | 100/100 | 0/100 | 100/100 | 100/100 | 70/100 | 65/100 |
| Resistance | Pencil hardness | 2H | 2H | 2B | 3H-4H | 2H | 2H | 2H-3H | 2H-3H |
| | Rub resistance | ○ | ○ | X | ○ | ○ | ○ | ○ | ○ |
| | Water resistance | ○ | ○ | X | ○ | ○ | ○ | ○ | ○ |
| LED curability | | Δ-X | ○ | ○ | ○ | Δ-○ | ○ | ○ | ○ |

The active energy ray-curable inkjet ink compositions conforming to the present invention were low in viscosity and had appropriate surface tension before curing.

Additionally, they cured under LEDs and their cured coating films had good adhesion property, as well as high pencil hardness, rub resistance, and water resistance, on various types of base materials.

However, Comparative Example 1 not containing any polyfunctional amine-modified oligomer (A) was poor in LED curability, while Comparative Example 2 containing a large amount of polyfunctional amine-modified oligomer (A) made the ink composition highly viscous, potentially causing poor discharge property. Comparative Example 3 not containing any polyfunctional monomer with a glass transition temperature of 10° C. or lower (E) made the coating film low in pencil hardness and poor in rub resistance and water resistance, while Comparative Example 4 containing an excessive amount of polyfunctional monomer with a glass transition temperature of 10° C. or lower (E) resulted in inferior adhesion property on each base material and the cured coating film was too hard.

Also, Comparative Example 5 with a low content of nitrogen-containing monofunctional monomer (F) exhibited poor LED curability, whereas Comparative Example 6 with a high content of the same made the ink composition highly viscous, potentially causing poor discharge property. Comparative Examples 7 and 8 not using any polyfunctional monomer with a glass transition temperature of 10° C. or lower (E) but using a polyfunctional monomer with a glass transition temperature exceeding 10° C., resulted in the coating film having poor adhesion property on each base material.

What is claimed:

1. An active energy ray-curable inkjet ink composition satisfying all of requirements (A) to (F) below:

(A) a polyfunctional amine-modified oligomer is contained by 0.2 to 14.0% by mass in a total quantity of all polymerizable components;

(B) monofunctional monomers are contained by 50.0% by mass or more in the total quantity of all polymerizable components;

(C) a monofunctional monomer with a glass transition temperature of 20° C. or higher is contained by 30.0% by mass or more in the total quantity of all polymerizable components;

(D) a monofunctional monomer with a glass transition temperature of 10° C. or lower is contained by 20.0% by mass or more in the total quantity of all polymerizable components;

(E) a polyfunctional monomer with a glass transition temperature of 10° C. or lower is contained by 3.0 to 12.0% by mass in the total quantity of all polymerizable components; and (F) a nitrogen-containing monofunctional monomer is contained by 30.0 to 50.0% by mass in the total quantity of all polymerizable components, excluding a photocurable inkjet printing ink composition satisfying all of requirements (A) to (F) and further satisfying all of requirements A, B, D, and E:

A. 3,3,5-trimethylcyclohexyl acrylate is contained by 5 to 50% by mass in all photopolymerizable compounds;

B. a polyfunctional monomer and polyfunctional oligomer with a glass transition temperature of 10° C. or lower are contained by 3 to 15% by mass in total in all photopolymerizable compounds;

D. an amino group and/or amide group-containing monomer and/or oligomer are/is contained; and E. a viscosity of the ink composition is 10 mPa·s or lower at 25° C.

2. The active energy ray-curable inkjet ink composition according to claim 1, wherein the polyfunctional amine-modified oligomer (A) is a bifunctional amine-modified oligomer and its viscosity at 25° C. is 2000 cps or lower.

3. The active energy ray-curable inkjet ink composition according to claim 1, wherein the nitrogen-containing monofunctional monomer (F) comprises at least one type selected from a group that consists of acryloyl morpholine, vinyl methyl oxazolidinone, vinyl caprolactam, and N,N-dimethylacrylamide.

4. The active energy ray-curable inkjet ink composition according to claim 2, wherein the nitrogen-containing monofunctional monomer (F) comprises at least one type selected from a group that consists of acryloyl morpholine, vinyl methyl oxazolidinone, vinyl caprolactam, and N,N-dimethylacrylamide.

* * * * *